United States Patent [19]

Ban

[11] Patent Number: 5,357,616
[45] Date of Patent: Oct. 18, 1994

[54] ON-LINE COMPUTER SYSTEM CAPABLE OF SAFELY AND SIMPLY PROCESSING A MESSAGE SIGNAL

[75] Inventor: Takayuki Ban, Tokyo, Japan

[73] Assignee: NEC Corporation, Tokyo, Japan

[21] Appl. No.: 822,957

[22] Filed: Jan. 21, 1992

[30] Foreign Application Priority Data

Jan. 21, 1991 [JP] Japan .................... 3-021668

[51] Int. Cl.$^5$ .................. G06F 11/00; G06F 11/16
[52] U.S. Cl. .................... 395/275; 395/575; 395/250
[58] Field of Search .............. 395/250, 275, 200, 575; 371/37.6, 67.1; 364/238.3

[56] References Cited

U.S. PATENT DOCUMENTS 4,745,605  5/1988  Goldman et al. .............. 394/49
4,864,531  9/1989  Quatse et al. ................ 395/275
5,204,865  4/1993  Moritoki et al. .............. 371/67.1

Primary Examiner—Dale M. Shaw
Assistant Examiner—D. Dinh
Attorney, Agent, or Firm—Foley & Lardner

[57] ABSTRACT

For processing an input message signal into a processed message signal, an on-line computer system comprises a saving buffer for memorizing as a memorized message signal a received message signal supplied from a message receiving circuit for receiving the input message signal. A processing unit produces a first request signal to be supplied with the received message signal as a first supplied message signal and produces a second request signal to be supplied with the memorized message signal as a second supplied message signal while processing the first and the second supplied message signals into the processed message signal. The memorized message signal is erased from the saving buffer when the processing unit produces a normal end signal representing a normal end of processing. The memorized message signal may be erased from the saving buffer when the processing unit produces the first request signal. The processing unit may be supplied with the second supplied message signal by producing a third request signal when the processing unit fails to process the first and the second supplied message signals.

3 Claims, 4 Drawing Sheets

ON-LINE COMPUTER SYSTEM CAPABLE OF SAFELY AND SIMPLY PROCESSING A MESSAGE SIGNAL

BACKGROUND OF THE INVENTION

The present invention relates to an on-line computer system which is for processing an input message signal into a processed message signal.

A conventional on-line computer system comprises a message receiving circuit, a message receiving buffer, a supplying circuit, an erasing circuit, and a processing unit having a message holding buffer. In the conventional on-line computer system, the message receiving circuit is supplied with an input message signal to produce a received message signal. Connected to the message receiving circuit, the message receiving buffer holds the received message signal as a held message signal. Connected to the supplying circuit, the processing unit is supplied with a supplied message signal and processes the supplied message signal in response to a program into a processed message signal to produce a request signal. In the processing unit, the message holding buffer holds the supplied message signal. Connected to the message receiving buffer and the processing unit, the supplying circuit is supplied with the request signal to supply the held message signal as the supplied message signal to the processing unit and produces an erasing signal after supply of the supplied message signal to the processing unit by the supplying circuit. Connected to the message receiving buffer and the supplying circuit, the erasing circuit erases the held message signal from the message receiving circuit when the erasing circuit is supplied with the erasing signal.

In the manner described above, the message holding buffer is included in the processing unit of the on-line computer system according to the prior art. It is therefore possible to safely process the input message signal to a certain extent without undesired loss of the message signal.

The conventional on-line computer system is impossible to completely safely process and simply process the input message signal.

SUMMARY OF THE INVENTION

It is therefore an object of this invention to provide an on-line computer system which is capable of safely and simply processing an input message signal.

Other objects of this invention will become clear as the description proceeds.

According to an aspect of this invention, there is provided an on-line computer system which is for processing an input message signal into a processed message signal and which comprises: a message receiving circuit supplied with the input message signal for producing a received message signal, message holding means connected to the message receiving circuit for holding the received message signal as a held message signal; memorizing means supplied with a first supplied message signal for memorizing the first supplied message signal as a memorized message signal; processing means supplied with first supplied message signal and a second supplied message signal for processing the first and the second supplied message signals into the processed message signal to produce a first request signal, a second request signal, and a normal end signal representing a normal end of processing the first and the second supplied message signals, first supplying means connected to the message holding means, the memorizing means, and the processing means and supplied with the first request signal for supplying the held message signal as the first supplied message signal to the memorizing means and to the processing means and for producing an erasing signal after supply of the first supplied message signal by the first supplying means; first erasing means connected to the message holding means and the first supplying means for erasing the held message signal from the message holding means when the first erasing means is supplied with the erasing signal; second supplying means connected to the memorizing means and the processing means for supplying the memorized message signal to the processing means as the second supplied message signal when the second supplying means is supplied with the second request signal; and second erasing means connected to the memorizing means and the processing means for erasing the memorized message signal from the memorizing means when the second erasing means is supplied with the normal end signal.

According to another aspect of this invention, there is provided an on-line computer system which is for processing an input message signal into a processed message signal and which comprises: a message receiving circuit supplied with the input message signal for producing a received message signal; message holding means connected to the message receiving circuit for holding the received message signal as a held message signal; memorizing means supplied with a first supplied message signal for memorizing the first supplied message signal as a memorized messaage signal; processing means supplied with the first supplied message signal and a second supplied message signal for processing the first and the second supplied message signals into the processed message signal to produce a first request signal and a second request signal; first supplying means connected to the message holding means, the memorizing means, and the processing means and supplied with a primary request signal for supplying the held message signal as the first supplied message signal to the memorizing means and to the processing means and for producing a first erasing signal after supply of the first supplied message signal by the first supplying means; first erasing means connected to the message holding means and the first supplying means for erasing the held message signal from the message holding means when the first erasing means is supplied with the first erasing signal; second supplying means connected to the memorizing means and the processing means for supplying the memorized message signal to the processing means as the second supplied message signal when the second supplying means is supplied with the second request signal; a message control unit connectd to the first supplying means and the processing means for producing the primary request signal and a second erasing signal when the message control unit is supplied with the first request signal, and second erasing means connected to the memorizing means and the message control unit are erasing the memorized message signal from the memorizing means when the second erasing means is supplied with the second erasing signal.

According to still another aspect of this invention, there is provided an on-line computer system which is for processing an input message signal into a processed message signal and which comprises: a message receiving circuit supplied with the input message signal for producing a received signal; message holding means connected to the message receiving circuit for holding the received message signal as a held message signal; memorizing means supplied with a first supplied message signal for memorizing the first supplied message signal as a memorized message signal; processing means supplied with the first supplied message signal and a second supplied message signal for processing the first and the second supplied message signals into the processed message signal to produce a first request signal, a second request signal, and a normal end signal representing a normal end of processing the first and the second supplied message signals and to produce a restarting signal representing a request for restart of the processing means when the processing means fails to process the first and the second message signals; first supplying means connected to the message holding means, the memorizing means, and the processing means and supplied with the first request signal for supplying the held message signal as the first supplied message signal to the memorizing means and to the processing means and for producing a first erasing signal after supply of the first supplied message signal by the first supplying means; first erasing means connected to the message holding means and the first supplying means for erasing the held message signal from the message holding means when the first erasing means is supplied with the first erasing signal; second supplying means connected to the memorizing means and the processing means for supplying the memorized message signal to the processing means as the second supplied message signal when the second supplying means is supplied with any one of the second request signal and a third request signal; a control signal producing unit connected to the processing means and the second supplying means for producing a second erasing signal when the control signal producing unit is supplied with the normal end signal, the control signal producing circuit being for producing the third request signal when the control signal producing unit is supplied with the restarting signal; and second erasing means connected to the memorizing means and the control signal producing unit for erasing the memorized message signal from the memorizing means when the second erasing means is supplied with the second erasing signal.

DESCRIPTION OF THE PREFERRED EMBODIMENT

Figure 1:
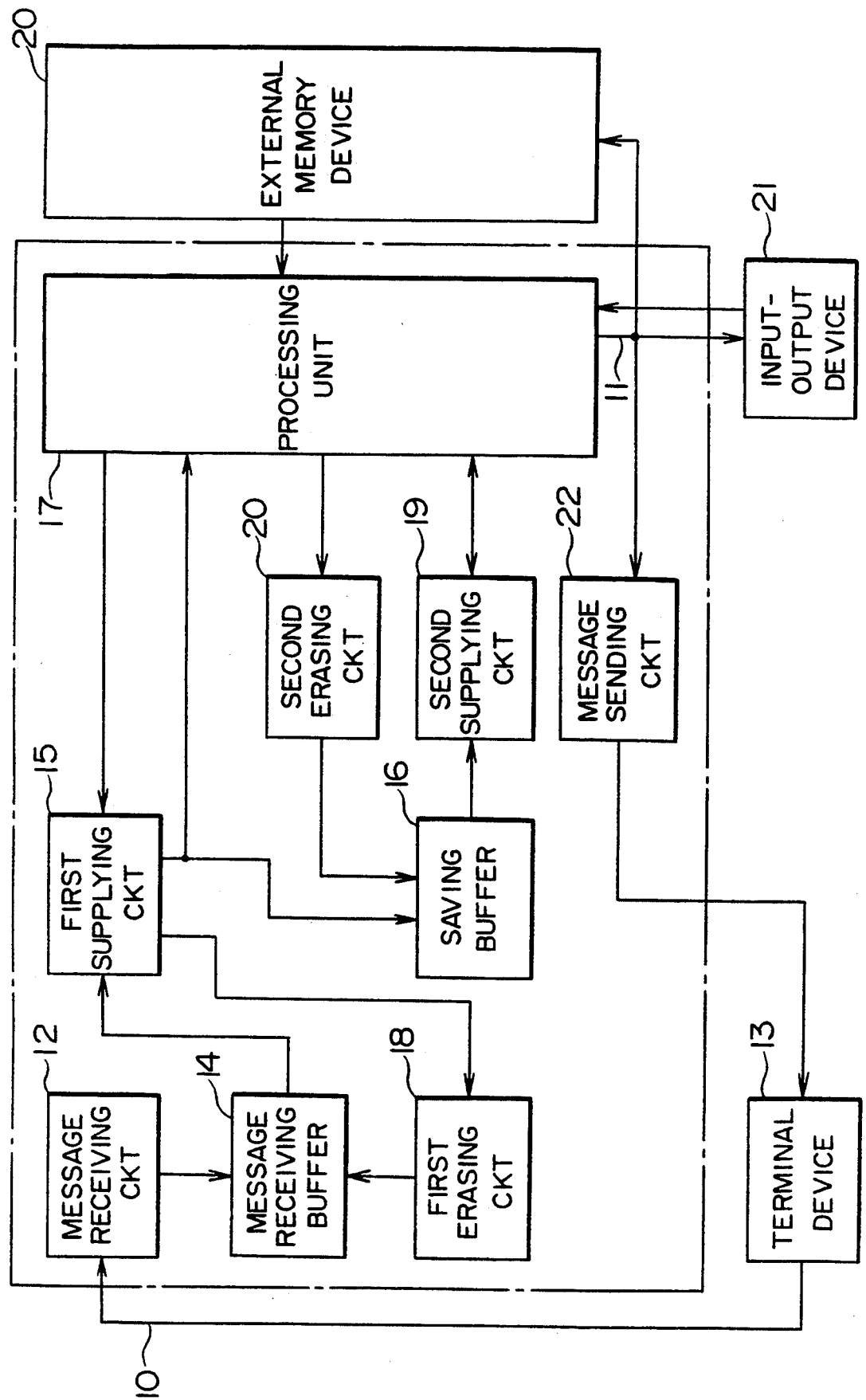
FIG. 1 is a block diagram of an on-line computer system according to a first embodiment of this invention.

Referring to FIG. 1, an on-line computer system according to a preferred embodiment of this invention is for processing an input message signal 10 into a processed message signal 11. The on-line system computer comprises a message receiving circuit 12. The message receiving circuit 12 is connected to a terminal device 13. Supplied with the input message signal 10 from the terminal device 13, the receiving circuit 12 produces a received message signal. A message receiving buffer 14 is connected to the message receiving circuit 12. Supplied with the received message signal from the message receiving circuit 12, the message receiving buffer 14 holds the received message signal as a held message signal.

The message receiving buffer 14 is connected to a first supplying circuit 15. The first supplying circuit 15 is connected to a saving buffer 16 and a processing unit 17. Supplied with the held message signal from the message receiving buffer 14 and a first request signal from the processing unit 17 in the manner which will presently be described, the first supplying circuit 15 supplies the held message signal as a first supplied message signal to the saving buffer 16 and the processing unit 17 and produces an erasing signal after supply of the first supplied message signal by the first supplying circuit 15. Supplied with the first supplied message signal from the first supplying circuit 15, the saving buffer 16 memorizes the first supplied message signal as a memorized message signal.

A first erasing circuit 18 is connected to the message receiving buffer 14 and the first supplying circuit 15. Supplied with the erasing signal from the first supplying circuit 15, the first erasing circuit 18 erases the held message signal from the message receiving buffer 14.

A second supplying circuit 19 is connected to the saving buffer 16 and the processing unit 17. Supplied with a second request signal from the processing unit 17, the second supplying circuit 19 supplies the memorized message signal from the saving buffer 16 to the processing unit 17 as a second supplied message signal. The processing unit 17 is connected to an external memory device 20. The external memory device 20 memorizes memory data. The processing unit 17 is supplied with the memory data from the external memory device 20. The external memory device 20 is supplied with the processed message signal 11 from the processing unit 17 and memorizes the processed message signal 11 as the memory data. Supplied with the first and the second supplied message signals from the first and second supplying circuits 15 and 19 and the memory data from the external memory device 20 in a known manner, the processing unit 17 processes, in compliance with a program, the first and the second supplied message signals into the processed message signal 11 by using the memory data to deliver the first request signal to the first supplying circuit 15, the second request signal to the second supplying circuit 19, and a normal end signal to the second erasing circuit 20. The normal end signal represents a normal end of processing the first and the second supplied message signals and will shortly be described.

Figure 2:
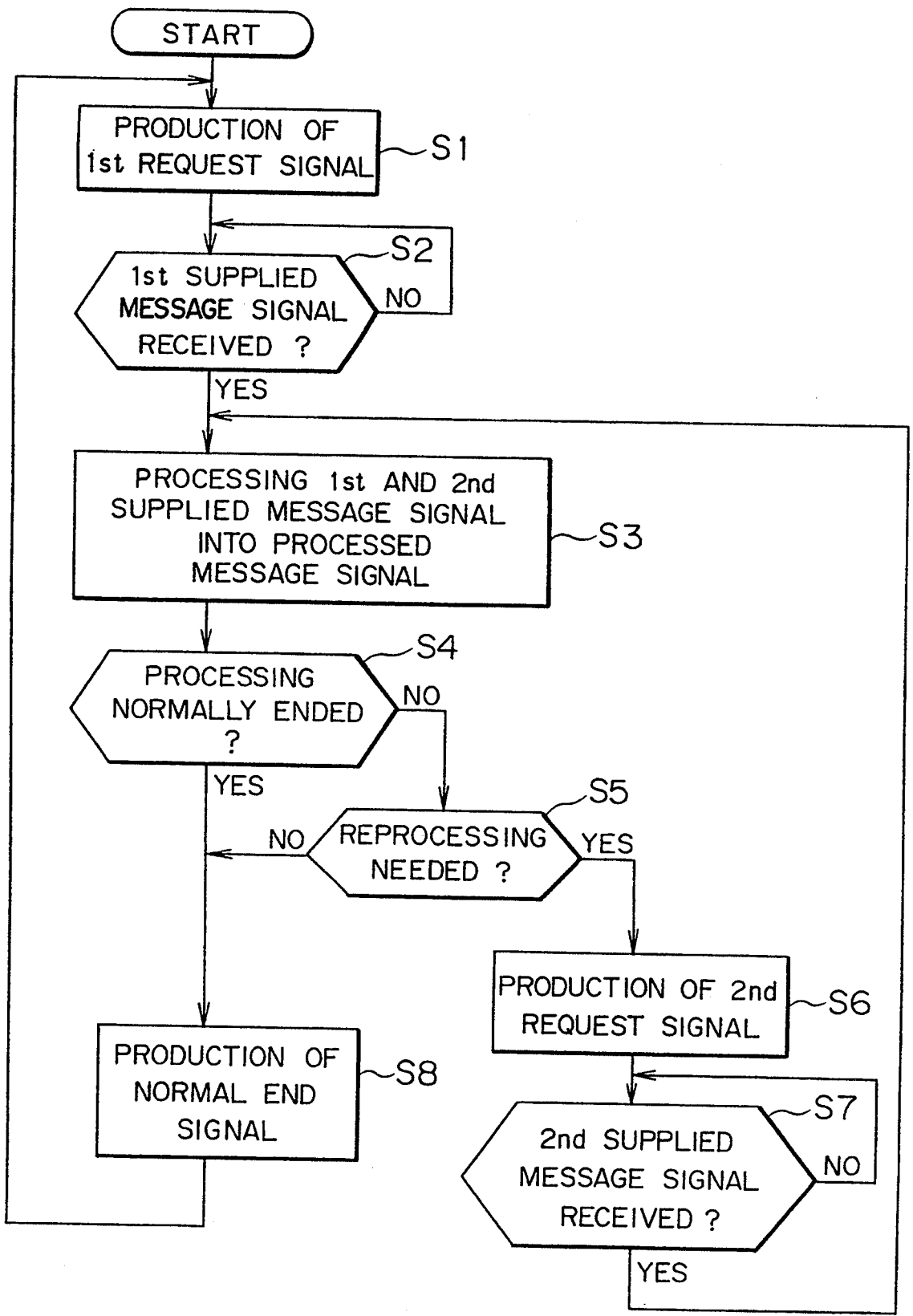
FIG. 2 is a flow chart for use in describing operation of the on-line computer system illustrated in FIG. 1.

Turning to FIG. 2 with reference to FIG. 1 continued, operation of the processing unit 17 will be described more in detail. At a first stage S1, the processing unit 17 supplies the first request signal to the first supplying circuit 15. At a second stage S2, the processing unit 17 judges whether or not the first supplied message signal is received from the first supplying circuit 15. The second stage S2 is repeatedly carried out until the first supplied message signal is received. When the first supplied message signal is received, the processing unit 17 processes at a third stage S3 the first and the second supplied message signals into the processed message signal 11. At a fourth stage, the processing unit 17 judges whether or not processing of the first and the second supplied message signals has normally ended. When the processing unit judges that processing of the first and the second supplied signals does not yet come to a normal end, the processing unit 17 judges, at a fifth stage S5, whether or not reprocessing of the first and the second supplied message signals is needed.

When the processing unit 17 judges at the fifth stage S5 that reprocessing of the first and the second supplied message signals is needed, the processing unit 17 delivers, at a sixth stage S6, the second request signal to the second supplying circuit 20. At a seventh stage S7, the processing unit 17 judges whether or not the second supplied message signal is received from the second supplying circuit 20. When the processing unit 17 judges that the second supplied message signal is received, operation of the processing unit 17 returns to the third stage S3.

When the processing unit 17 judges, at the fourth stage S4, that processing of the first and the second supplied message signals comes to the normal end, the processing unit 17 delivers, at an eighth stage S8, the normal end signal to the second erasing circuit 20. Operation of the processing unit 17 returns to the first stage S1. When the processing unit 17 judges, at the fifth stage S5, that reprocessing of the first and the second supplied message signals is unnecessary, operation of the processing unit 17 proceeds to the eighth stage S8.

Turning back to FIG. 1, a second erasing circuit 20 is connected to the saving buffer 16 and the processing unit 17. Supplied with the normal end signal from the processing unit 17, the second erasing circuit 20 erases the memorized message signal from the saving buffer 16.

An input-output device 21 is connected to the processing unit 17. The input-output device 21 produces an input operation signal for putting the processing unit 17 into operation of accepting the input operation signal. The input-output device 21 is supplied with the processed message signal 11 from the processing unit 17. A message sending circuit 22 is connected to the processing unit 17 and the terminal device 13. Supplied with the processed message signal 11 from the processing unit 17, the message sending circuit 22 delivers the processed message signal 11 to the terminal device 13 as an output message signal.

Figure 3:
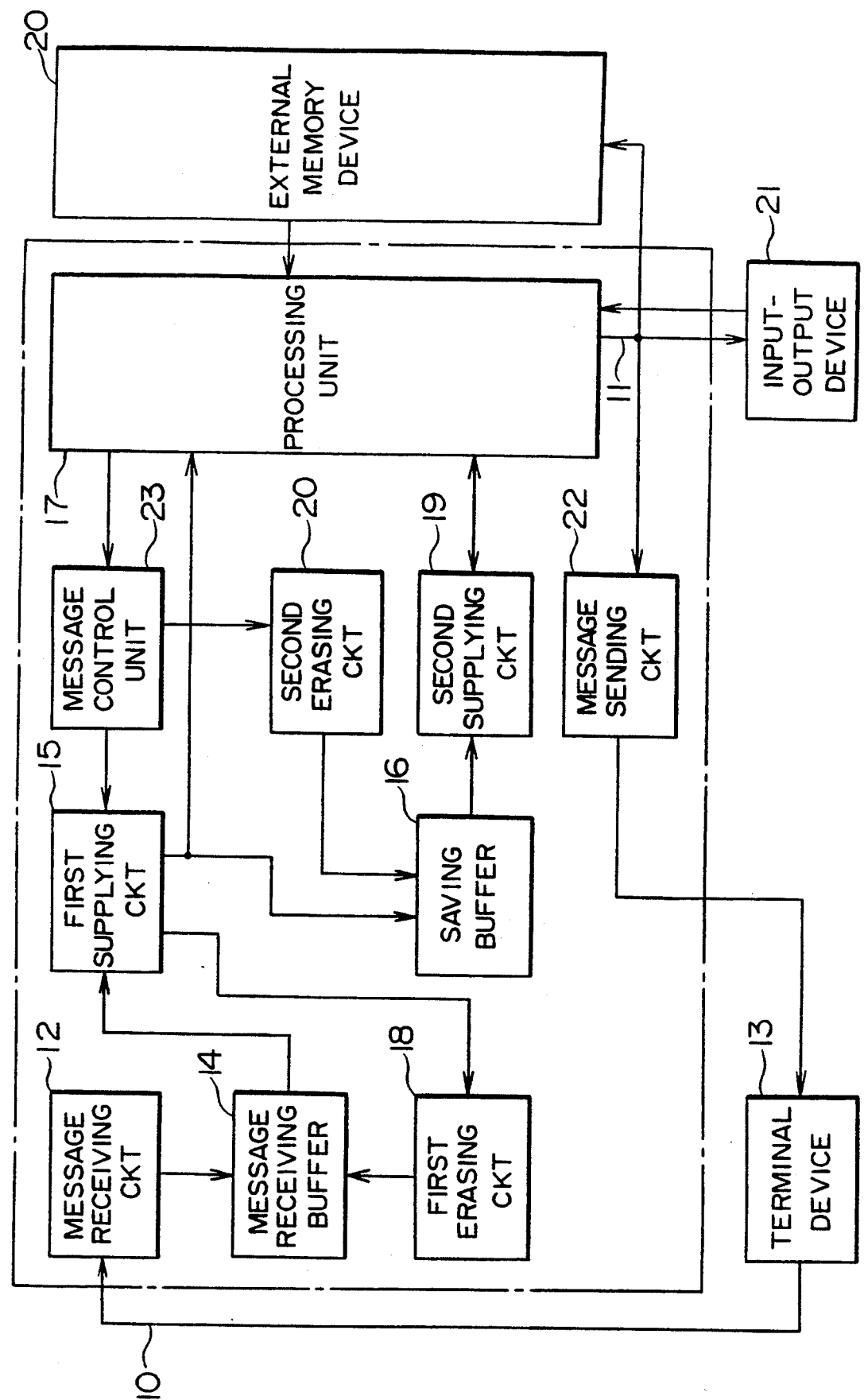
FIG. 3 is a block system diagram of an on-line computer system according to a second embodiment of this invention.

Referring now to FIG. 3, the description will proceed to an on-line computer system according to a second embodiment of this invention. In FIG. 3, the on-line computer system comprises similar parts designated by like reference numerals and furthermore comprises a message control unit 23 connected to the first supplying circuit 15, the processing unit 17, and the second erasing unit 20.

Turning again to FIG. 2 during a short while, let the processing unit 17 judge, at the fourth stage S4, that processing of the first and the second supplied message signals comes to the normal end and let the processing unit 17 judge, at the fifth stage S5, that reprocessing of the first and the second supplied message signals is necessary. Under the circumstances, operation of the processing unit 17 returns to the first stage S1. Namely, operation of the processing unit 17 comprises the first through the seventh stages S1 to S7.

Turning back to FIG. 3, the message control unit 23 is supplied with the first request signal from the processing unit 17 and produces a primary request signal and a primary erasing signal. Supplied with the primary request signal from the message control unit 23, the first supplying circuit 15 produces a secondary erasing signal to supply the secondary erasing signal to the first erasing circuit 18. The secondary erasing signal is equivalent to the erasing signal which is produced by the first supplying circuit 15 illustrated in FIG. 1. Supplied with the primary erasing signal from the message control unit 23, the second erasing circuit 20 erases the memorized message signal from the saving buffer 16.

Figure 4:
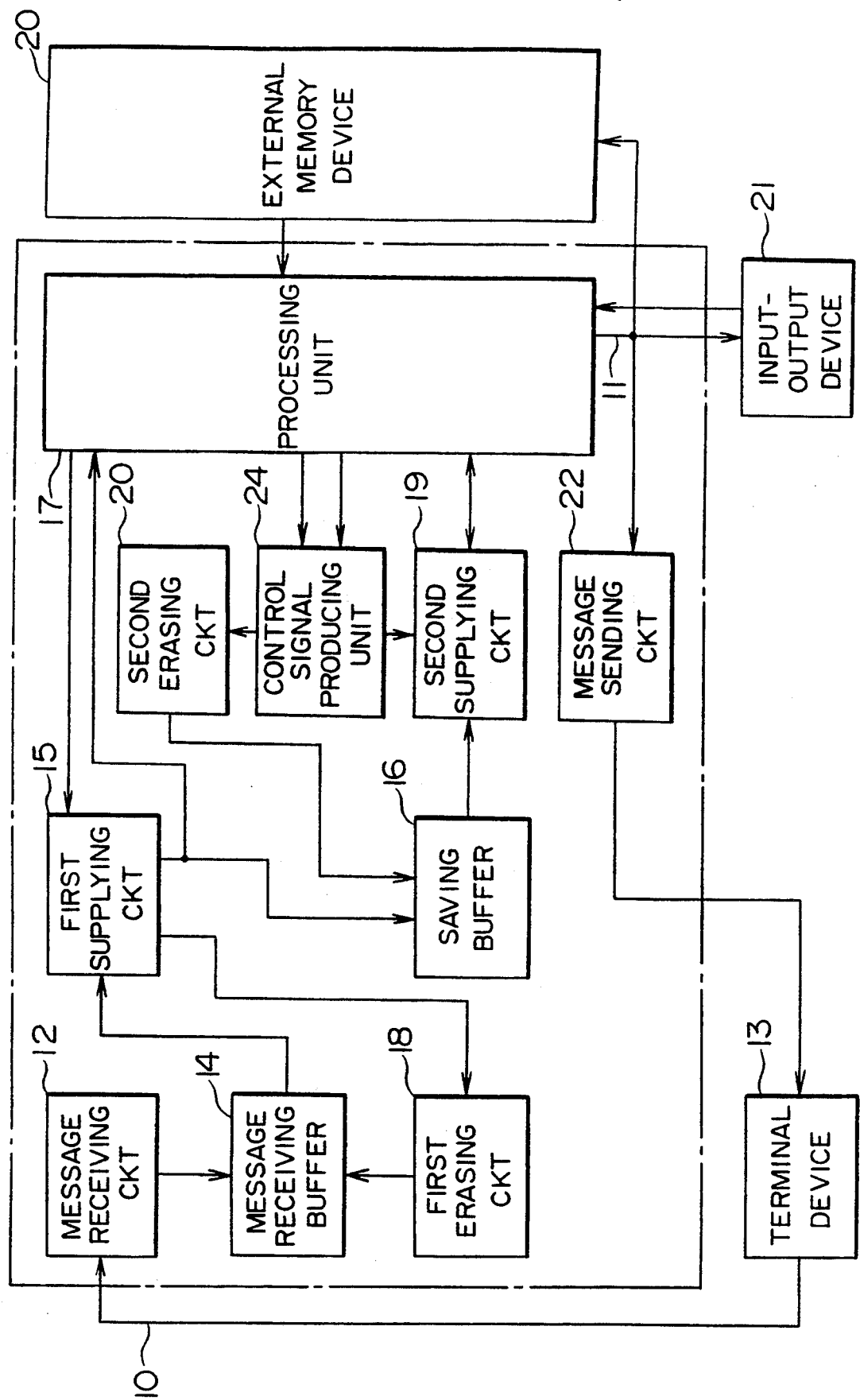
FIG. 4 is a block diagram of an on-line computer system according to a third embodiment of this invention.

Referring to FIG. 4, attention will be directed to an on-line computer system according to a third embodiment of this invention. In FIG. 4, the on-line computer system comprises similar parts designated by like reference numerals and furthermore comprises a control signal producing unit 24 connected to the processing unit 17, the second supplying circuit 19, and the second erasing circuit 20.

Operation of the processing unit 17 comprises the first through the eighth stages S1 to S8 described in conjunction with FIG. 2. It will now be assumed that the processing unit 17 fails to process the first and the second message signals at the third stage S3. In this event, the processing unit 17 produces, at a ninth stage (not shown), a restarting signal representing a request for restart of the processing unit 17. In other words, operation of the processing unit 17 returns to the first stage S1 from the third stage S3.

The control signal producing unit 24 produces a first erasing signal when the control signal producing unit 24 is supplied with the normal end signal from the processing unit 17. The control signal producing unit 24 produces a third request signal when the control signal producing unit 24 is supplied with the restarting signal from the processing unit 17.

Supplied with the first erasing signal from the control signal producing unit 20, the second erasing circuit 20 erases the memorized message signal from the saving buffer 16. Supplied with the third request signal from the control signal producing unit 24, the second supplying circuit 19 supplies the memorized message signal from the saving buffer 16 to the processing unit 17 as the second supplied message signal. That is, the second supplying circuit 19 supplies the second supplied message signal to the processing unit 17 when the second supplying circuit 19 is supplied with any one of the second request signal and the third request signal, namely, either when the processing unit 17 judges that reprocessing of the first and the second message signals is needed or when the control signal producing unit 24 is supplied with the restarting signal. Supplied with the first request signal from the processing unit 17, the first supplying circuit 15 produces a second erasing signal to supply the second erasing signal to the first erasing circuit 18. The second erasing signal is equivalent to the erasing signal which is produced by the first supplying circuit 15 illustrated in FIG. 1.

What is claimed is:

1. An on-line computer system for processing an input message signal into a processed message signal, comprising:

a message receiving circuit supplied with said input message signal for producing a received message signal;

message holding means connected to said message receiving circuit for holding said received message signal as a held message signal;

memorizing means supplied with a first supplied message signal for memorizing means supplied with a first supplied message signal for memorizing said first supplied message signal as a memorized message signal;

processing means supplies with said first supplied message signal and a second supplied message signal for processing said first and said second supplied message signals into said processed message signal and for producing a first request signal, a second request signal, and a normal end signal representing a normal end of processing said first and said second supplied message signals;

first supplying means connected to said message holding means, said memorizing means, and said processing means and supplied with said first request signal for supplying said held message signal as said first supplied message signal to said memorizing means and to said processing means and for producing an erasing signal after supply of said first supplied message signal;

first erasing means connected to said message holding means and said first supplying means for erasing said held message signal from said message holding means when said first erasing means is supplied with said erasing signal;

second supplying means connected to said memorizing means and said processing means for supplying said memorized message signal to said processing means as said second supplied message signal when said second supplying means is supplied with said second request signal; and second erasing means connected to said memorizing means and said processing means for erasing said memorized message signal from said memorizing means when said second erasing means is supplied with said normal end signal.

2. An on-line computer system for processing an input message signal into a processed message signal, comprising:

a message receiving circuit supplied with said input message signal for producing a received message signal;

message holding means connected to said message receiving circuit for holding said received message signal as a held message signal;

memorizing means supplied with a first supplied message signal for memorizing said first supplied message signal as a memorized message signal;

processing means supplied with said first supplied message signal and a second supplied message signal for processing said first and said second supplied message signals into said processed message signal and for producing a first request signal and a second request signal;

first supplying means connected to said message holding means, said memorizing means, and said processing means and supplied with a primary request signal for supplying said held message signal as said first supplied message signal to said memorizing means and to said processing means and for producing a first erasing signal after supply of said first supplied message signal;

first erasing means connected to said message holding means and said first supplying means for erasing said held message signal from said message holding means when said first erasing means is supplied with said first erasing signal;

second supplying means connected to said memorizing means and said processing means for supplying said memorized message signal to said processing means as said second supplied message signal when said second supplying means is supplied with said second request signal;

a message control unit connected to said first supplying means and said processing means for producing said primary request signal and a second erasing signal when said message control unit is supplied with said first request signal; and second erasing means connected to said memorizing means and said message control unit for erasing said memorized message signal from said memorizing means when said second erasing means is supplied with said second erasing signal.

3. An on-line computer system for processing an input message signal into a processed message signal, comprising:

a message receiving circuit supplied with said input message signal for producing a received message signal;

message holding means connected to said message receiving circuit for holding said received message signal as a held message signal;

memorizing means supplied with a first supplied message signal for memorizing said first supplied message signal as a memorized message signal;

processing means supplied with said first supplied message signal and a second supplied message signal for processing said first and said second supplied message signals into said processed message signal and for producing a first request signal, a second request signal, and a normal end signal representing a normal end of processing said first and said second supplied message signals and for producing a restarting signal representing a request for restart of said processing means when said processing means fails to process said first and said second message signals;

first supplying means connected to said message holding means, said memorizing means, and said processing means and supplied with said first request signal for supplying said held message signal as said first supplied message signal to said memorizing means and to said processing means and for producing a first erasing signal after supply of said first supplied message signal;

first erasing means connected to said message holding means and said first supplying means for erasing said held message signal from said message holding means when said first erasing means is supplied with said first erasing signal;

second supplying means connected to said memorizing means and said processing means for supplying said memorized message signal to said processing means as said second supplied message signal when said second supplying means is supplied with any one of said second request signal and a third request signal;

a control signal producing unit connected to said processing means and said second supplying means for producing a second erasing signal when said control signal producing unit is supplied with said normal end signal, and for producing said third request signal when said control signal producing unit is supplied with said restarting signal; and second erasing means connected to said memorizing means and said control signal producing unit for erasing said memorized message signal from said memorizing means when said second erasing means is supplied with said second erasing signal.

* * * * *